G. O. MILLER.
TRAP.
APPLICATION FILED DEC. 15, 1906.

913,221.  Patented Feb. 23, 1909.

Witnesses:
Christ Feinle
Harry D. Rapp

George O. Miller, Inventor
By Emil Neuhart,
Attorney.

UNITED STATES PATENT OFFICE.

GEORGE O. MILLER, OF NORTH TONAWANDA, NEW YORK, ASSIGNOR TO LOUIS A. KELSEY, OF NORTH TONAWANDA, NEW YORK.

TRAP.

No. 913,221.          Specification of Letters Patent.          Patented Feb. 23, 1909.

Application filed December 15, 1906. Serial No. 348,005.

*To all whom it may concern:*

Be it known that I, GEORGE O. MILLER, residing at North Tonawanda, in the county of Niagara and State of New York, have invented certain new and useful Improvements in Traps, of which the following is a specification.

This invention relates to water-sealing traps, such as are used in pipe systems in plumbing, or the like.

Heretofore, when using traps in connection with wash-basins, sinks, bath-tubs, etc., it has been necessary to cut the connecting pipe to exact size, as no allowance could be made for adjustment; the trap partitions being at an angle to the direction of the pipe, or curved to cross the axis of the pipe opening; serving in all instances as a stop against the insertion of the pipe beyond what is actually necessary to prevent leakage.

It has also been the practice in traps of this kind to arrange one of the trap-partitions at an incline to the axis of the overflow-pipe, but in all cases the partition is perfectly straight or curved with the concave side facing the overflow, so that the waste water entering the inlet of the trap is directed upward into the overflow pipe causing the sediment and grease to accumulate at the bottom of the overflow, thus rendering the trap unsanitary.

These objections my invention is designed to overcome, and it consists in the construction and arrangement of the several parts to be hereafter described and particularly pointed out in the appended claims.

Figure 1:
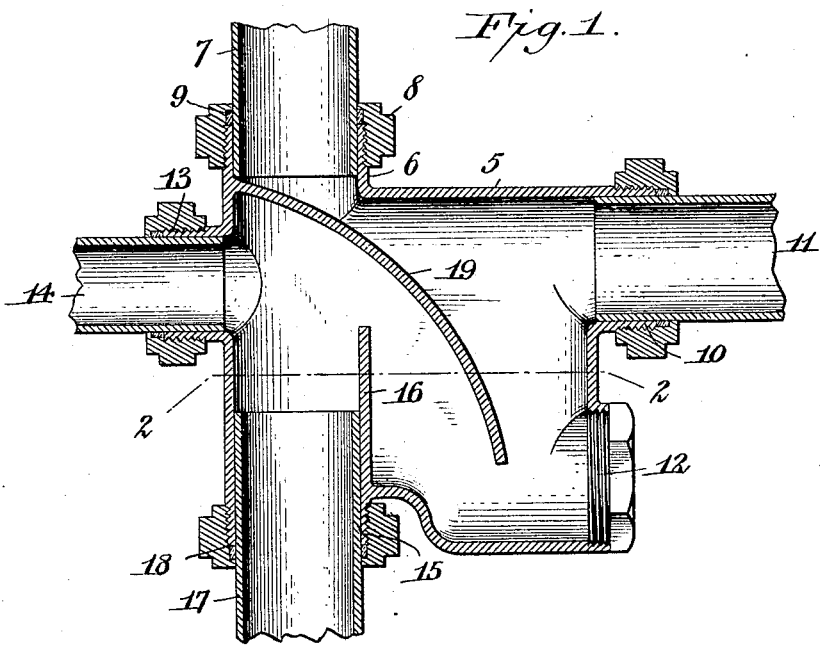
Figure 2:
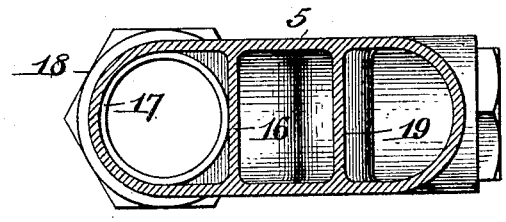

In the drawings,—Figure 1 is a longitudinal section through a trap constructed according to my invention. Fig. 2 is a transverse section taken on line 2—2, Fig. 1.

The casing 5 may be of any desired size or form, but my preference, I construct the same so that it is quite narrow compared to its length and height, which enables me to apply it in narrow spaces and within partitions of buildings and the like.

At the upper end of the casing is a neck 6 into which is fitted an overflow pipe 7, held in said neck by a compression-nut 8 acting in a manner common in slip-joint couplings against a rubber gasket 9 which is compressed around the pipe, and affords a tight joint between the latter and the trap-casing.

An inlet-neck 10 is provided at one end of the casing, into which is fitted by a slip-joint, the outlet pipe 11 of a bath tub, basin, or the like; and beneath said inlet-neck is a screw-plug 12 which closes a threaded opening and which may be conveniently removed for the purpose of cleaning the trap. A vent-neck 13 is formed on the casing at the opposite end thereof, and connected thereto by a slip-joint is a vent pipe 14 which is led to the open air.

At the lower end of the trap, and preferably coincident with the overflow-inlet is an outlet-neck 15, and extending inward from this neck in a direct or rightline is a trap partition 16 having its longitudinal center coincident with the inner face of the neck. Entering said neck and the space between trap partition 16 and the adjacent end wall of the trap, is the outlet pipe 17, which may be inserted into the trap to any extent desired and connected by a slip-joint 18. Considerable difficulty is experienced at times in cutting the pipe to the right length, but in the use of my invention, the pipe when extending into the body of the casing does not change the depth of the water seal or lessen the efficiency of the trap.

Much time and labor is saved in the use of this trap, inasmuch as the pipe when cut longer than necessary, may enter into the body of the trap until the end thereof is even with the upper end of the trap-partition 16.

A curved or inclined trap-partition 19 is arranged in the trap-chamber between the overflow and inlet pipes 7 and 11, respectively, and the trap-partition 16. Trap-partition 19 is made concavo-convex and extends from a point between the overflow and vent pipes downward and toward the opposite end of the casing and terminates below the inlet pipe 11 and between the screw-plug and partition 16.

The convex side of the partition 19 faces the inlet 11 so that the inrushing waste-water is deflected upward against the top wall of the trap-casing instead of directing it into the overflow as would be the tendency if the concave side of said partition were faced to the inlet. This prevents the accumulation of grease and sediment in the overflow, which would in time clog the passage therein.

Having thus described my invention, what I claim is,—

1. A trap consisting of a casing having an inlet at one end, an over-flow inlet in its upper wall, an outlet in its lower wall, a vertical trap-partition extending inward from said outlet, a concavo-convex trap-partition between said inlets and said outlet and having its convex surface facing said inlets and its concave surface facing said outlet, and a pipe entering said outlet and having a range of adjustment from said outlet to the inner end of said vertical partition.

2. A trap consisting of a casing having an inlet at one end, an overflow inlet in its upper wall, an outlet in its lower wall, a vertical trap-partition extending inward from said outlet, and a concavo-convex trap-partition between said inlets and said outlet and having its convex surface facing said inlets and its concave surface facing said outlet.

In testimony whereof, I have affixed my signature in the presence of two subscribing witnesses.

GEORGE O. MILLER.

Witnesses:
EMIL NEUHART,
ELLA C. PLUECKHAHN.